April 26, 1932. O. GLASSER ET AL 1,855,669
METHOD AND APPARATUS FOR THE MEASUREMENT OF RADIATION INTENSITY
Filed July 11, 1928 2 Sheets-Sheet 2
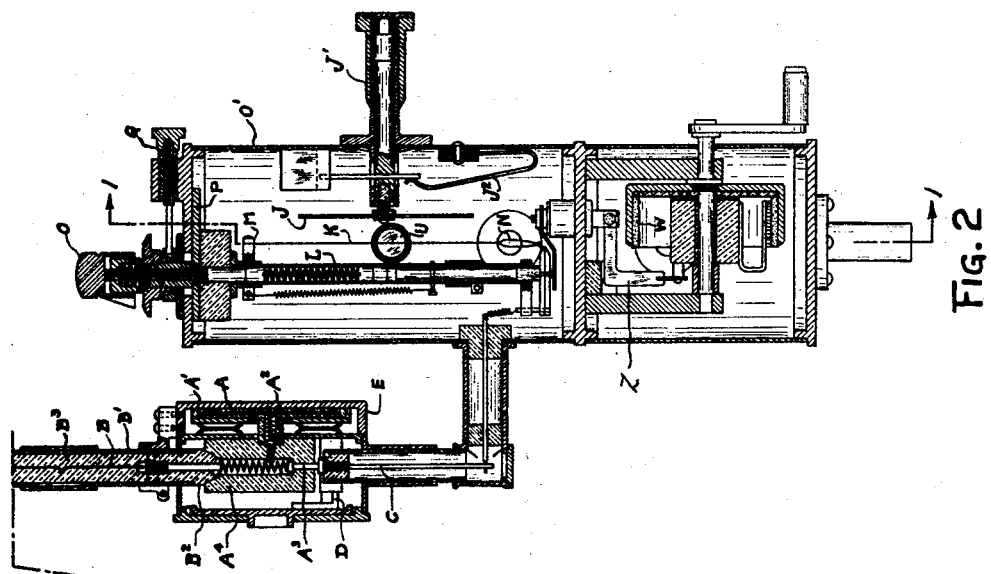
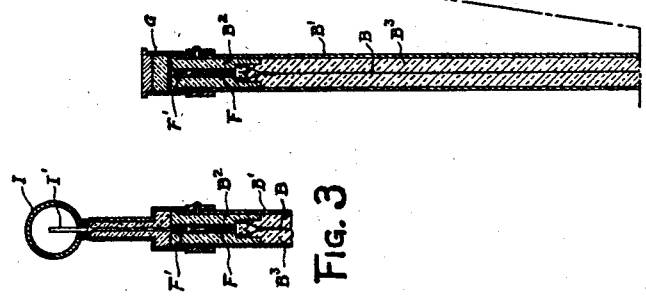
Inventors
O. Glasser
V. B. Seitz
By Hull Brock & West
Attorney Patented Apr. 26, 1932

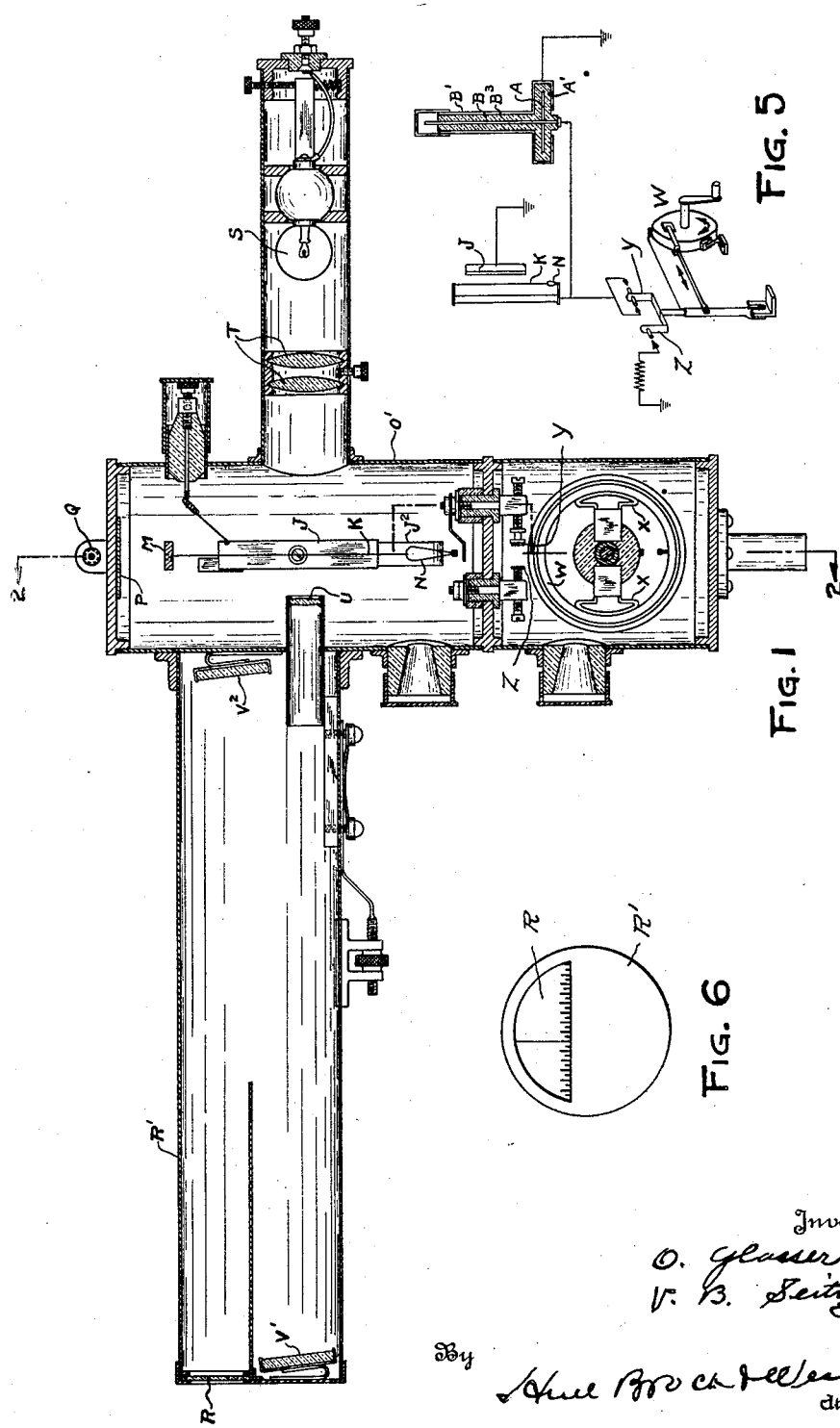

1,855,669

UNITED STATES PATENT OFFICE

OTTO GLASSER AND VALENTINE B. SEITZ, OF CLEVELAND, OHIO, ASSIGNORS TO THE CLEVELAND CLINIC FOUNDATION, OF CLEVELAND, OHIO, A CORPORATION OF OHIO

METHOD AND APPARATUS FOR THE MEASUREMENT OF RADIATION INTENSITY

Application filed July 11, 1928. Serial No. 291,913.

This invention relates to a novel method and apparatus for measuring radiation intensity.

The object of the invention is to provide a comparatively simple, highly efficient and accurate device for the purpose described and characterized by having a detachable part which is subjected to the radiation to be measured, in contradistinction to subjecting the entire apparatus to such radiation.

With this object in view the invention consists in generating, storing and indicating a definite electro-static charge, detaching a charge carrying part from the charge generating, creating and indicating means, and subjecting the same to radiation for a definite period of time and then replacing said part and indicating the loss which has occurred during the exposure to radiation.

The invention consists also in providing a condenser unit having an ionization chamber, said condenser unit and chamber being detachable from a combined charging and indicating device, the condenser unit being charged to a known potential after which it is removed and placed with its ionization chamber in the field of radiation which is to be measured, said condenser unit with ionization chamber being replaceable upon the combined charging and measuring device for the purpose of indicating the loss of charge which is directly readable upon the indicator.

The invention consists also in the various details of construction and in the manner of combining or arranging the same all of which will be fully described hereinafter and set forth in the appended claim.

In the drawings forming a part of this specification Fig. 1 is a vertical longitudinal sectional view taken through the apparatus and showing the charging device and means for indicating the deflection of the string of the electrometer; Fig. 2 is a transverse vertical section of the condenser unit and charging device and electrometer; Figs. 3 and 4 are enlarged detail views illustrating different forms of ionization chambers; and Fig. 5 is a diagrammatic view illustrating the principles of the method and apparatus employed in the carrying out of our invention; and Fig. 6 is a detail of the screen of an indicating device.

Broadly speaking, the method and apparatus involve two parts, one a condenser to which an ionization chamber is attached, and secondly an improved type of string electrometer including a static generator. These parts thus broadly mentioned are employed as follows, the condenser unit is electrically connected with the electrometer unit and the whole system charged to a known potential which is indicated on the electrometer scale. The condenser unit is then removed and placed with its ionization chamber in the field of radiation which is to be measured. After the chamber has been exposed for a specified length of time, the condenser unit is again returned or replaced upon the electrometer and the loss of charge due to the ionization of the air in the ionization chamber is directly read upon the scale, thus indicating the intensity of radiation.

The condenser unit with its ionization chamber is a comparatively small part of the apparatus, and it alone is placed in the field of radiation. Consequently the combined charging device, electrometer and indicating means are not in the least affected by the radiation and consequently accuracy of measurement can be obtained.

The condenser unit comprises in the main a chargeable plate A, preferably circular in shape and entirely surrounded by solid dielectric A' such as amber. Connected centrally to this chargeable plate is the spring actuated member $A^2$ which is electrically connected to a spring actuated member $A^3$ arranged centrally within the amber block $A^4$. Through this spring member $A^3$ the plate A has two connections one with the wire B mounted in the tube B' and leading to the inner electrode of the ionization chamber. The other connection C establishes the connection between the plate A and the charging device and electrometer. Both of these leads B and C are at all points surrounded by a suitable dielectric.

In practice we prefer to employ amber plugs $B^2$ at each end of the tube B' and in which are located the screws to which the wire B is connected. The interior of the tube may be filled with ceresin or any other suitable dielectric as indicated at B³. The lower end of the amber plug B² is tapered and fitted into the tapered recess formed in the upper end of the amber block A⁴. The plate A and parts connected therewith are contained in a suitable casing E and within this chamber is arranged a suitable cut-off switch or closure D of amber or other suitable dielectric connected to the rotatable front of the casing in which the switch D is moved when the condenser unit is lifted from the charging device so as to bring the same into covering relation to the lower end of the spring actuated member A³ and consequently seal the condensed unit against escape of the charge. The exterior of the condenser unit is at ground potential and is connected with the wall of the ionization chamber which is also at ground potential.

The wire B which leads from the condenser plate A is connected at its upper end to a screw or bolt F the upper end of which is formed into a chuck F' to receive the electrode which extends into the ionization chamber, this combined screw and chuck being surrounded by the amber block or bushing B², as previously described. An amber-lined metal cap G is fitted upon the upper end of the tube B', this cap being removed when the ionization chamber is placed thereon. Ionization chambers of different sizes may be employed according to the nature of the work to be done and we have indicated two different types and sizes, a small cylindrical one H, and a larger spherical one I, each one having an electrode I' extending thereinto and this electrode in turn extending through an amber bushing and entering the chuck or connecting member F' arranged in the upper end of the tube B'. The ionization chambers are of course made of definite size with walls of definite thickness, and in practice these chambers have been made of graphite with aluminum electrodes I' extending thereinto.

The electrometer is of the string type and comprises an adjustable attracting plate J which may be moved back and forth by a screw feeding device J', aided by a spring J². This plate J can be moved toward or away from the string K as desired. The plate J is normally at ground potential while the string K and its tubular support L are at the potential of the condensing unit previously described. The string K is of very fine platinum wire fastened at its upper end to a metal clip M which in turn is fixed to the tubular supporting frame L. The lower end of the wire is cemented to a quartz loop N which can be displaced in a vertical direction to alter the controlling force on the string. This loop N is comparatively small and is made of fused quartz. When the string is under tension the loop takes an elliptical form as most clearly indicated. Tension upon the string is had by means of a micrometer screw O on the top of the casing O', this screw being graduated in arbitrary units. The string and mounting are also fixed to a cross slide P which permits lateral movement of the string across the optical axis of the instrument as hereinafter explained.

Q indicates the differential screw which is employed for making this lateral adjustment. This screw, however, is not graduated as the setting of the string is made by observing its image on the screen R, the shadow of the string being projected on the graduated ground glass of the screen at the end of the horizontal tubular portion R' of the casing.

Light for the projection of the shadow and for the reading on the scale is supplied by a lamp S, preferably a concentrated gas fuel lamp, mounted in a universally adjustable ball-and-socket receptacle. In advance of the light S are two condenser lenses T for illuminating the field in the plane of the string, and an objective U is mounted on a focusing slide in the path of the projected light on the string.

In practice we have employed the lenses and focusing slide to bring the image to focus at 70 c. m. distance. The objective has a focal length of 14 m. m. and the working distance is somewhat greater. The object of using a long focal length lens with a considerably greater scale distance is to prevent the string from being attracted to the lens mount which is at ground potential. A small deflection of the string in the direction of the lens has little effect on the sharpness of the image where the working distance is large. In order to conserve space the image is twice reflected within the tubular hood R' by means of the mirrors V' and V² mounted upon spring holders and capable of adjustment. The tubular portion R' containing the mirrors, objective and scale is approximately 24 c. m. long.

In the lower part of the casing O' is arranged the static generator comprising a rotary hard rubber tube W against which two chamois covered pads X are held by spring tension. The pad support has attached to it two contact springs, Y which electrically connect the collector brush to the string system when the crank is turned in a clockwise direction, and Z which connects the string to the ground through a suitable resistance leak when the crank is turned in the opposite direction, thus allowing perfect control of the string potential or of the position. Provision may be made for attaching a dry bulb to either the upper or lower part of the casing O' in order to absorb any moisture which may be present. By turning the crank in clockwise direction a charge is created or generated and being communicated to the string, the string is deflected due to plate attraction and this movement of the string slight as it is is graphically indicated upon the graduated screen R through the medium of the lamp S, concentrating lenses T, projector U and reflecting mirrors V' and V².

At the same time that the charge is being generated and the string deflected, the charge is being communicated to the condenser plate A and the entire condenser unit, string and charger will be of the same potential. The measure of the charge is now indicated upon the graduated screen. The condenser unit is then removed from the charging and measuring device and with its ionization chamber is placed in the field of radiation where it remains for a definite period of time. The change which takes place is due to ionization, as the condenser unit itself is not effected by the radiation. The condenser unit and its ionization chamber is then replaced upon the combined charging and measuring unit and immediately a change takes place in the position of the string due to the fact that during the exposure of the condenser unit, ionization of the air in the ionization chamber has taken place, and consequently a proportionate loss of charge from the condenser, and the entire system immediately readjusts itself and indicates the potential or intensity of the charge remaining. The difference will, of course, indicate the measure of the radiation intensity. Thus, for example, if after charging the entire system the shadow of the wire appears upon the graduated ground glass screen in line with the numeral 50 it indicates that the strength of the charge is 50 units. After the condenser is removed the shadow of the wire remains in line with the numeral 50, but after the condenser unit has been replaced after a definite exposure, the shadow of the wire will be seen to move back a definite number of degrees, say to 40, thus indicating that 10 units of radiation intensity have been used.

I have found that my device is well adapted for successful measurements of Roentgen rays, radium rays, etc. over a range of wave length from 0.02 to 3.0 Angstrom units.

It will thus be seen that by this method and apparatus an accurate gauge or measure of the dose or intensity of radiation can be accurately measured.

It will of course be understood that when the condenser unit is separated and placed in the zone of radiation, the condenser unit per se is not affected by the radiation but the ionization chamber alone is affected.

While we have shown and described an ionization chamber for use in connection with the condenser unit it will be understood that some other means than an ionization chamber may be employed such as a photoelectric cell attached to the condenser unit.

Having thus described our invention, what we claim is:

A device of the class described including a casing, a static electric generator therein, an electrometer in said casing, a screen, means for projecting an image of an indicating member of said electrometer on said screen, said generator being electrically connected to said electrometer, a condenser unit detachably connected to said casing and when attached being in electrical contact with said electrometer, said condenser unit including an ionization chamber, and means for sealing a charge in said chamber when said unit is detached.

In testimony whereof, we hereunto affix our signatures.

OTTO GLASSER.
V. B. SEITZ.